United States Patent [19]

Storlie

[11] Patent Number: 5,212,532
[45] Date of Patent: May 18, 1993

[54] ELECTROPHOTOGRAPHIC COLOR PRINTER USING GRIT WHEELS FOR IMPARTING LINEAR MOTION TO THE PRINTED MEDIA

[75] Inventor: Chris A. Storlie, Boise, Id.

[73] Assignee: Hewlett-Packard Company, Palo Alto, Calif.

[21] Appl. No.: 883,844

[22] Filed: May 15, 1992

[51] Int. Cl.$^5$ .......................................... G03G 15/01
[52] U.S. Cl. ................................... 355/326; 346/157
[58] Field of Search ............... 355/308, 309, 317, 326, 355/327; 118/645; 346/157; 271/84, 3.1, 14, 42

[56] References Cited

U.S. PATENT DOCUMENTS

| 4,908,675 | 3/1990 | Suzuki | 355/326 |
| 4,933,727 | 6/1990 | Mizuma et al. | 355/327 |
| 4,987,428 | 1/1991 | Bannai et al. | 346/157 |
| 5,121,170 | 6/1992 | Bannai et al. | 355/326 |

*Primary Examiner*—A. T. Grimley
*Assistant Examiner*—William J. Royer

[57] ABSTRACT

A color printer and method of operation wherein a plurality of color toners located within a fixed position carousel are transferred to the surface of a photoconductive drum. The media on which a printed image is to be formed is mounted on a stationary platform beneath the photoconductive drum, and the printed media is driven linearly back and forth on the fixed position platform during the formation of each of the cyan, yellow, magenta, and black color planes on the media. Then the media containing thee composite cyan, yellow, magenta, and black color image is passed through a pair of fuser rollers wherein the composite color image is fused into the media before the media is passed to an output media collection bin. During the above operation, the media supporting platform moves vertically in and out of contact with the photoconductive drum, allowing a pair of grit wheels to linearly move the paper within the printer housing and along the surfaces of contoured paper guides at each end of the platform. This feature minimizes the linear path of media travel in the printer, and in turn enables a significant reduction in the linear media travel dimension of the color printer.

9 Claims, 4 Drawing Sheets

ELECTROPHOTOGRAPHIC COLOR PRINTER USING GRIT WHEELS FOR IMPARTING LINEAR MOTION TO THE PRINTED MEDIA

TECHNICAL FIELD

This invention relates generally to electrophotographic color printing and more particularly to a linear multiple pass laser color printer which is operative to eliminate certain critical alignment problems during the transfer of color images to a print medium.

RELATED APPLICATIONS

Various electrophotographic color printing techniques are disclosed and claimed in U.S. Pat. No. 5,093,674 issued Mar. 3, 1992, and entitled "Method and System For Compensating For Paper Shrinkage And Misalignment In Electrophotographic Color Printing", in my co-pending application Ser. No. 07/758,011 filed Sep. 12, 1991, and entitled "Improved Fuser Method and Apparatus For Reducing Media Curl In Electrophotographic Printers", and in my copending application Ser. No. 07/812,236 filed Dec. 17, 1991, and entitled "Electrophotographic Color Printer and Method", all fully incorporated herein by reference.

BACKGROUND ART

In the field of electrophotographic color printing wherein cyan, yellow, magenta, and black color toners are developed in sequence and serially applied to the surface of a print medium, certain known color image development processes have required that separate photoconductive drums be used in the development of each of the cyan, yellow, magenta, and black color images. An example of a linear laser color printing system wherein cyan, magenta, yellow, and black colors are applied in series to a print medium, such as paper, and there superimposed as C, M, Y, and K color images on top of one another is disclosed in U.S. Pat. No. 4,660,077 issued to Kawamura et al and assigned to Canon of Japan and incorporated herein by reference.

One disadvantage of the process and system disclosed in the above Kawamura et al patent is that this approach to color printing uses separate photoconductive drums for each of the C, M, Y, and K primary colors. These individual drums are positioned in a line adjacent to one another and located immediately adjacent to the transfer medium. Thus, this color printer arrangement requires that these individual photoconductive drums be precisely aligned with respect with each other in order to ensure good image matching, good color resolution and print quality of the reproduced color image. In addition, the approach in Kawamura et al U.S. Pat. No. 4,660,077 requires that the photoconductive drums used therein be precisely and exactly sized and shaped in order to further assure a precise multiple color image alignment and pattern replication and an exact positioning of the C, Y, M, and K primary colors on top of one another to form the composite multi-color image on the print medium.

Another type of laser color printer and copier of the prior art which uses a single photoconductive drum for image reproduction purposes has been designed to use a rotating drum on which the print medium is wrapped during the printing process. The requirement for such a system carries with it a number of attendant disadvantages such as additional cost, lack of reliability, and maintenance. One such copier which is generally well known in the art and which uses such a rotating drum is the Canon Laser Copier 200 or the "CLC 200".

SUMMARY OF THE INVENTION

The general purpose and principal object of the present invention is to provide a novel alternative approach with respect to both the Kawamura et al approach in U.S. Pat. No. 4,660,077 and the rotating drum approach described above and which is operative to eliminate the above critical alignment problems and other disadvantages characteristic thereof.

Another object of this invention is to provide a new and improved color printing method and apparatus of the type described, which apparatus may be constructed at a relatively low manufacturing cost capable of a significant price/performance breakthrough in the art of electrophotographic color printing.

Another object of this invention is to provide a new and improved color printing apparatus of the type described which is relatively easy to construct and reliable in operation.

Another object of this invention is to provide a new and improved method and apparatus of the type described having good multiple color alignment characteristics when superimposing color images in series on top of one another on an adjacent print medium.

To accomplish the above purpose and objects, one embodiment of the present invention includes, among other things, a rotatable multiple color compartment housing and carousel positioned adjacent to a single photoconductive drum for developing the primary color toners of cyan, yellow, magenta, and black in sequence to the su:.face of the drum during a printing operation. A horizontal, paper support platform is provided adjacent to the photoconductive drum for providing controlled linear back and forth motion of the paper being printed relative to the outer surface of the photoconductive drum. Each C, Y, M, and K color plane from the four (4) color carousel is transferred in series first to the photoconductive drum and then to the paper for each successive back and forth linear movement cf the paper.

During the forward motion of the paper, the paper is in direct contact with the photoconductive drum during color image transfer thereon, whereas in the reverse direction of the paper, a linear paper drive mechanism drops down to remove the paper and its supporting platform from contact with the photoconductive drum. Using this approach, the apparatus according to this invention, including a multiple color carousel operative with a single photoconductive drum and a linear paper transport mechanism, may be constructed and operated using well developed linear paper drive mechanisms. These mechanisms are significantly less expensive than other known types of paper transport systems used in the printing apparatus of the known prior art.

In another embodiment of the invention, the above rotating color carousel has been replaced with a fixed position type carousel having projection type C, Y, M, and K rollers therein for electrostatically projecting color toners onto the photoconductive drum. In this second embodiment, the linear back and forth movement of the paper is driven by grit wheels, as used, for example, in Hewlett Packard plotters, rather than by a moving platform. During the forward motion of the paper, the grit wheels and the paper are positioned near the photoconductive drum along with a transfer corona to transfer one of each of the four C, Y, M, and K color planes, first to the photoconductive drum and then to the paper. During the reverse motion of the paper, the grit wheels, the paper, and the transfer corona all drop down to remove the paper from contact with the photoconductive drum, so that the paper may now move back to its original position in preparation for the transfer of the next color plane to the paper.

The above brief summary of the invention, together with its attendant objects, features, and various advantages, will become more readily apparent in the following description of the accompanying drawings.

DETAILED DESCRIPTION OF THE PREFERRED EMBODIMENTS

Figure 1A:
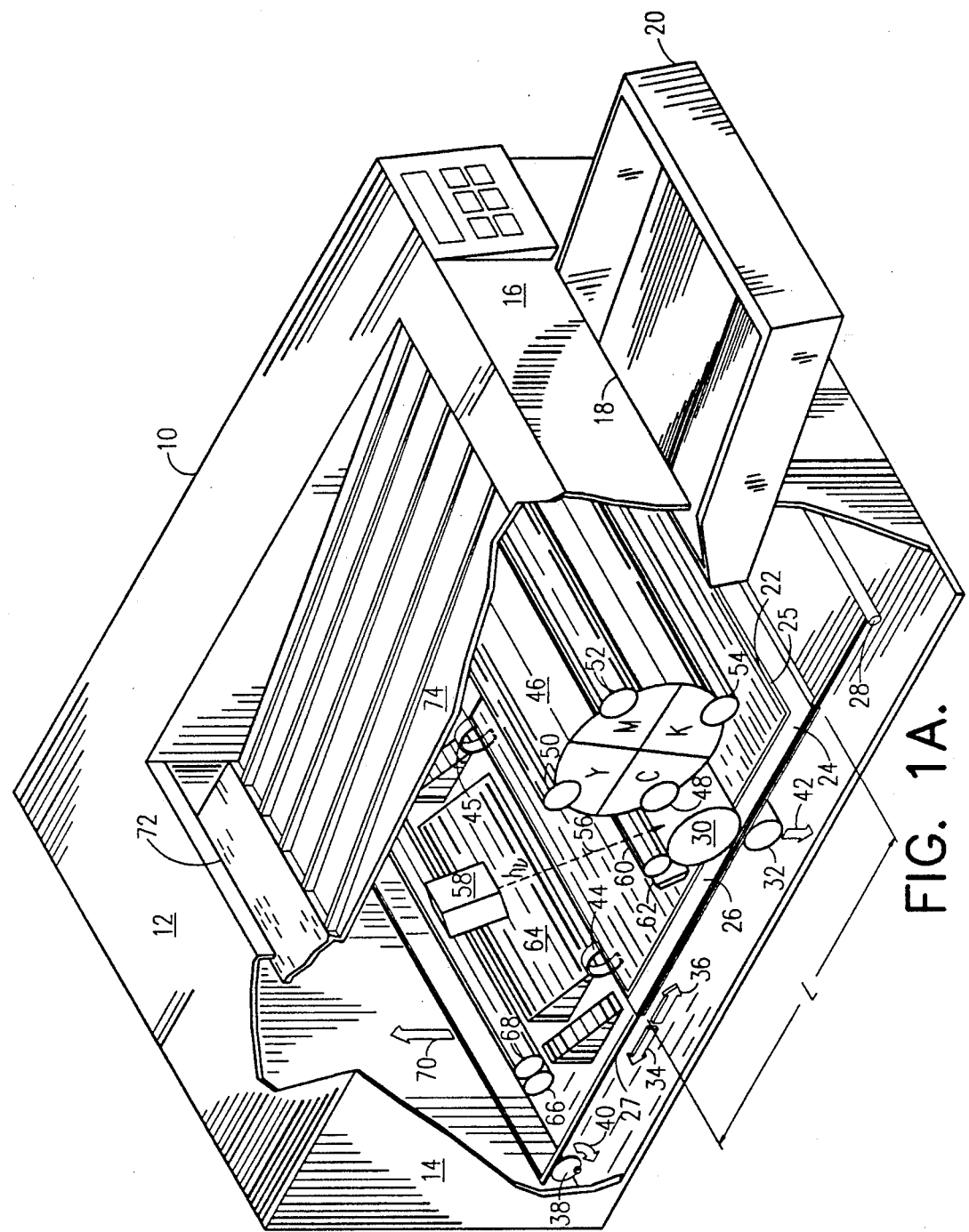
FIG. 1A is a partially cut-away isometric view of an electrophotographic color printer employing the rotatable carousel toner distribution system and associated linear paper transport mechanism constructed in accordance with a first embodiment of this invention.

Referring now to FIG. 1A, the electrophotographic color printer shown therein includes an outer housing 10 having a top wall 12, a near side wall 14 shown, and a front wall 16 with an opening 18 therein for receiving an input paper tray 20. Using conventional paper transport mechanisms, a sheet of paper 22 will be passed downwardly from the paper tray 20 and onto the upper surface 24 of a linear transport platform 26 which is mounted on a rail 27 located along the near side of the platform 26 and a like rail (not shown) located on the far and hidden side of the platform 26. In operation, the platform 26 moves along the rail 27 in the directions indicated by arrows 34 and 36. Furthermore, the rails 27 positioned at each end of a photoconductive drum 30 are pivotally mounted at the elongated cylindrical rod 28 as shown and can be pivoted by the rotational motion of the cam 38. This motion is in the direction indicated by arrow 40 which moves the rails 27 and a transfer roller 32 (which is also connected to the rails 27) vertically in the direction of the arrow 42.

The paper support platform 26 is positioned as shown between the photoconductive drum 30 and the image transfer roller 32. This platform 26 consists of a rigid frame shown in more detail in FIG. 1B and a dielectric sheet 25 upon which the paper 22 rests and through which the transfer roller 32 exerts its necessary transfer force. The platform 26 will move a distance L in the direction of the arrow 34 along the rails 27 during each forward motion thereof and during the time that each color plane C, Y, M, or K is being transferred in series from the surface of the photoconductive drum 30 to the upper surface of the paper 22 carried by the platform 26. Then, before each retraction of the platform 26 in the direction of the arrow 36, the cam member 38 will rotate in the direction of arrow 40, dropping the two rails 27, the platform 26, the transfer roller 32, and the paper 22 in the direction of the arrow 42 by a pivoting motion of the above defined components about the cylindrical rod 28. In this manner, the surface of the printed paper 22 does not come in contact with the surface of the photoconductive drum 30 during the retraction motion of the paper 22. During the above operation, the paper 22 is secured on the upper surface of the paper support platform 26 by means of a pair of rotatable clips 44 and 45 mounted as shown underneath the left and right hand ends of the paper support platform 26 and shown in more detail in FIG. 1B herein.

A rotatable four compartment color toner supply carousel includes an outer cylindrical housing 46 having the separate cyan, yellow, magenta, and black quadrant compartments as indicated therein. Each of these four C, Y, M, and K compartments include, respectively, a C, Y, M, and K developer roller 48, 50, 52, and 54, and each of these developer rollers is operative to make successive contact with the surface of the photoconductive drum 30 during a 360° rotation of the carousel housing 46. A latent image is generated by a laser scanner 58 and is written by the laser beam 56 on the surface of the photoconductive drum 30 for each one of the C, Y, M, or K color planes. As the latent image on the surface of the photoconductive drum 30 rotates against the corresponding one of the C, Y, M, or K developer rollers 48, 50, 52, and 54, the latent image is developed into a toned image.

When the toned image on the photoconductor 30, rotating about its central axis, reaches the position adjacent to the paper 22, the cam 38 rotates to thereby lift the rails 27 vertically upward. This action in turn lifts the moveable platform 26, the transfer roller 32, and the paper 22 into contact with the photoconductive drum 30. At this time, the support platform 26 with the paper 22 thereon begins to move in the direction indicated by the arrow 34 at a speed equal to the velocity of the outer surface of the photoconductive drum 30. Thus, the support platform 26 and paper 22 are moving between the photoconductor 30 and the transfer roller 32 which rotate about their central axes. During this movement, and simultaneous with the color image development from one of the developers 48, 50, 52, or 54, the toned image is transferred from the photoconductive drum 30 and onto the paper 22 until the platform has moved a distance L corresponding to the complete transfer of one color plane of the entire image. During this image development process, a drum charging roller 60 and a cleaning blade 62 are positioned as shown adjacent to the surface of the photoconductive drum 30 and are operated in a well known manner.

After the transfer of the first color plane to the paper 22, the cam 38 will again rotate in the direction indicated by the arrow 40 which will pivot the rails 27 about the cylindrical rod 28. This action will move the platform 26, the transfer roller 32 and the paper 22 in a direction indicated by the arrow 42, so that when the platform 26 is retracted from the left to the right a distance L as viewed in FIG. 1A, the toner which was deposited on the paper 22 will not contact the photoconductive drum 30. Once these above steps have been performed, the first color plane has been developed onto the photoconductor 30 and then transferred to paper 22 and the paper 22 has been again moved to its starting position. This process is now repeated for each of the remaining of the C, Y, M, and K color planes.

After the development and transfer of the four unfused cyan, yellow, magenta, and black color planes to the paper 22, all developed color planes will then be simultaneously fused into the paper by rotating the clips 44 and 45 so as to release the paper and lift the paper edges, passing the paper 22 along the angled surface of a guide member 64 and between the two fuser rollers 66 and 68. When the four color planes have all been fused one upon another into the paper 22, the paper 22 is then passed upwardly in the direction of the arrow 70 and guided by a conventional paper guide mechanism and through the output paper feed port 72 at the left hand end of the output paper tray 74 as viewed in Figure IA.

Figure 1B:
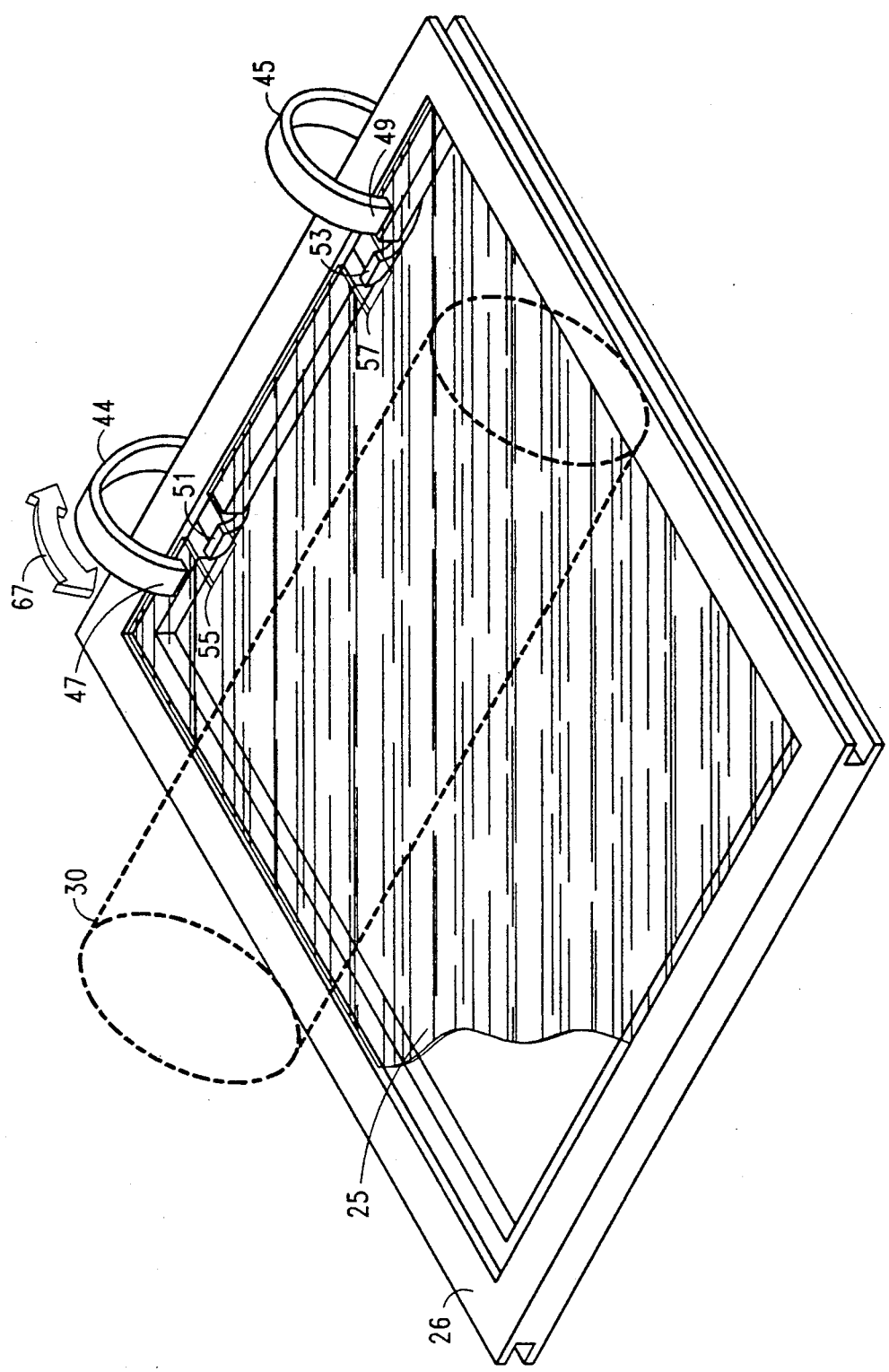
FIG. 1B is an enlarged perspective view showing the position of the photoconductive drum within the paper support platform of FIG. 1A.

Referring now to FIG. 1B, this enlarged perspective view shows the moving platform 26, the dielectric sheet 25, the photoconductor 30 and the rotatable clips 44 and 45. During operation, the paper is feed onto the platform 26 on top of the dielectric sheet 25. The leading edge of the paper 22 is secured by the rotatable clips which hold the paper between their leading edges 47 and 49 and the platform 26. The rotatable clips also operate to lift the edge of the paper prior to fusing by rotating approximately 60 degrees about the pivot point in the direction indicated by arrow 67. During this rotation, the rear edges 51 and 53 of these slightly twisted clips 44 and 45 are allowed to move through the two slots or openings 55 and 57 in the platform 26 to push the far edges of the paper 22 upwardly and then onto the slanted surface of the paper guide member 64 shown in FIG. 1A.

Figure 2A:
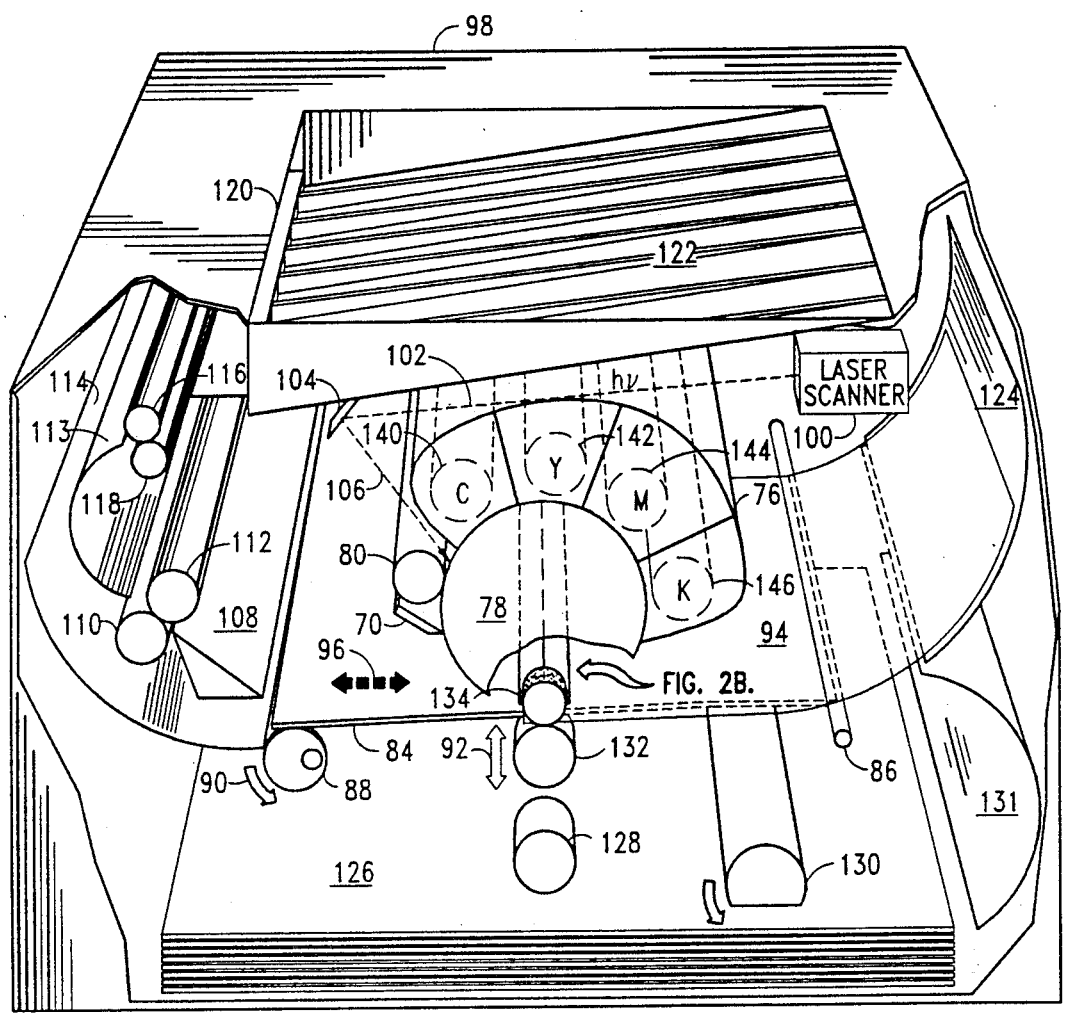
FIG. 2A is a partially cut-away perspective view of an electrophotographic color printer employing a fixed position carousel color toner distribution system and associated media transport mechanism constructed in accordance with a embodiment of this invention.

Referring now to FIG. 2A, the partially cut-away perspective view shown in this figure includes an electrophotographic color printer housing or casing 98 having a fixed position carousel having a four compartment housing 76 for the four color toners cyan, yellow, magenta, and black as indicated. The fixed position color toner housing 76 is mounted adjacent to the photoconductive drum 78 which, in turn, is mounted adjacent to charging roller 80 in a manner more particularly described in my above identified co-pending and co-assigned application Ser. No. 07/812,236 filed Dec. 17, 1991.

Similar to the platform operation described with reference to FIG. 1A above, the laser printer apparatus shown in FIG. 2A utilizes a horizontal motion of the paper 94 during the color printing process described below. However, in this embodiment, the paper 94 is not constrained to move with a moving platform, but is rather directly driven on the edges of the paper 94 by a pair of grit wheel rollers 132 and 134 on the near side of a platform 84 and another similar pair of grit wheel rollers (not shown) on the far side of the platform 84. The platform 84 does not move in the horizontal direction, but moves only in the vertical direction shown by arrow 92 and is driven by a cam rotating in the direction indicated by arrow 90.

The first step in the printing of the paper 94 by the apparatus in FIG. 2A is the rotation of a D-shaped feed roller 130 which picks the top sheet 94 of paper from paper stack 126. The paper sheet 94 is driver by the D-shaped roller 130 along the inner surface of the lower paper guide member 131, onto the upper surface of the platform 84, and between the grit wheels 132 and 134. At this time, the cam 88 rotates in the direction indicated by arrow 90, moving the platform 84, the paper 94, the grit wheels 132 and 134, and the transfer corona 82 in the downward direction indicated by arrow 92 and away from the photoconductor 78. The apparatus in this condition is now prepared to print.

In operation, the cleaning blade 70 prepares the photoconductive drum 78 so that the charging roller 80 can charge the surface of photoconductive drum 78 to the appropriate DC voltage. A laser scanner 100 generates a laser beam 102 which is directed at a mirror 104 where it is reflected in the direction of the path indicated by line 106 and onto the surface of the photoconductive drum 78 to develop a latent image of one of the four color planes. The resultant latent image thus produced on the surface of the photoconductive drum 78, which is rotating about its central axis, is passed to the corresponding developer 140, 142, 144, or 146 where it is developed into a toned image on the surface of the photoconductive drum 78. The dry color toners in each of the four toner compartments C, Y, M, and K are electrostatically projected on the surface of the photoconductive drum 78 in a manner more particularly described in my above identified co-pending application Ser. No. 07/812,236 filed Dec. 17, 1991. This single color toned image continues to rotate on the surface of the photoconductive drum 78 until it is adjacent to the paper 94.

At this time, the cam 88 rotates in the direction indicated by the arrow 90, which in turn moves the grit wheels 132 and 134, the transfer corona 82, the platform 84 and the paper 94 in the upward direction indicated by the arrow 92. This action engages the grit wheels 132 and 134 to move the paper 94 along platform 84 in the direction indicated by arrow 96 at a speed equal to the velocity of the outer surface of the photoconductive drum 78. As the paper 94 moves between the photoconductor 78 and the transfer corona 82, the toned images of one of the color planes are transferred from the photoconductive drum 78 and onto the paper 94. The paper 94 moves around the inner radius of paper guide 114 in order to keep the printer footprint minimized, which is possible due to operation of the grit wheel drive embodiment shown in FIG. 2A.

When the entire color plane is transferred to the paper 94, the cam 88 again rotates in the direction indicated by the arrow 90 so as to pivot the platform 84 about the cylindrical rod 86, moving the platform 84, the paper 94, the corona 82 and the grit wheels 132 and 134 in the downward direction indicated by the arrow 92. This motion places the rollers 132 into contact with reverse drive roller 128 which turns the grit wheels 132 and 134 in the opposite direction to the direction during the image transfer process. This motion moves the platform 84 in the direction of arrow 96, bringing the paper 94 back to its starting position as shown in FIG. 2A. The paper 94 is directed around the inner radius of paper guide 124 to maintain a small printer footprint.

With the first color plane transferred to the paper 94 and with the paper 94 in the proper position, the apparatus is ready for the transfer of the second color plane. This second color plane of C, Y, M, or K is developed and transferred in the same way as the first, as are the third and fourth color planes. Since conventional mechanical drive mechanisms may be employed for both the grit wheel and paper drive purposes for both the grit wheels 132 and 134, and the paper stack 126, such drive mechanisms are not shown in detail herein.

After all of the color planes are developed and have been transferred one on top of another to the paper 94, the paper 94 is passed over the surface of the paper guide 108 and between the two fuser rollers 110 and 112 where all C, Y, M, and K color planes are fused simultaneously into the paper 94. The paper 94 is then guided by a contoured paper guide member 113 and moved through a pair of output paper guide rollers 116 and 118, then through the output paper exit port 120 and finally into an output paper receiving bin 122.

Figure 2B:
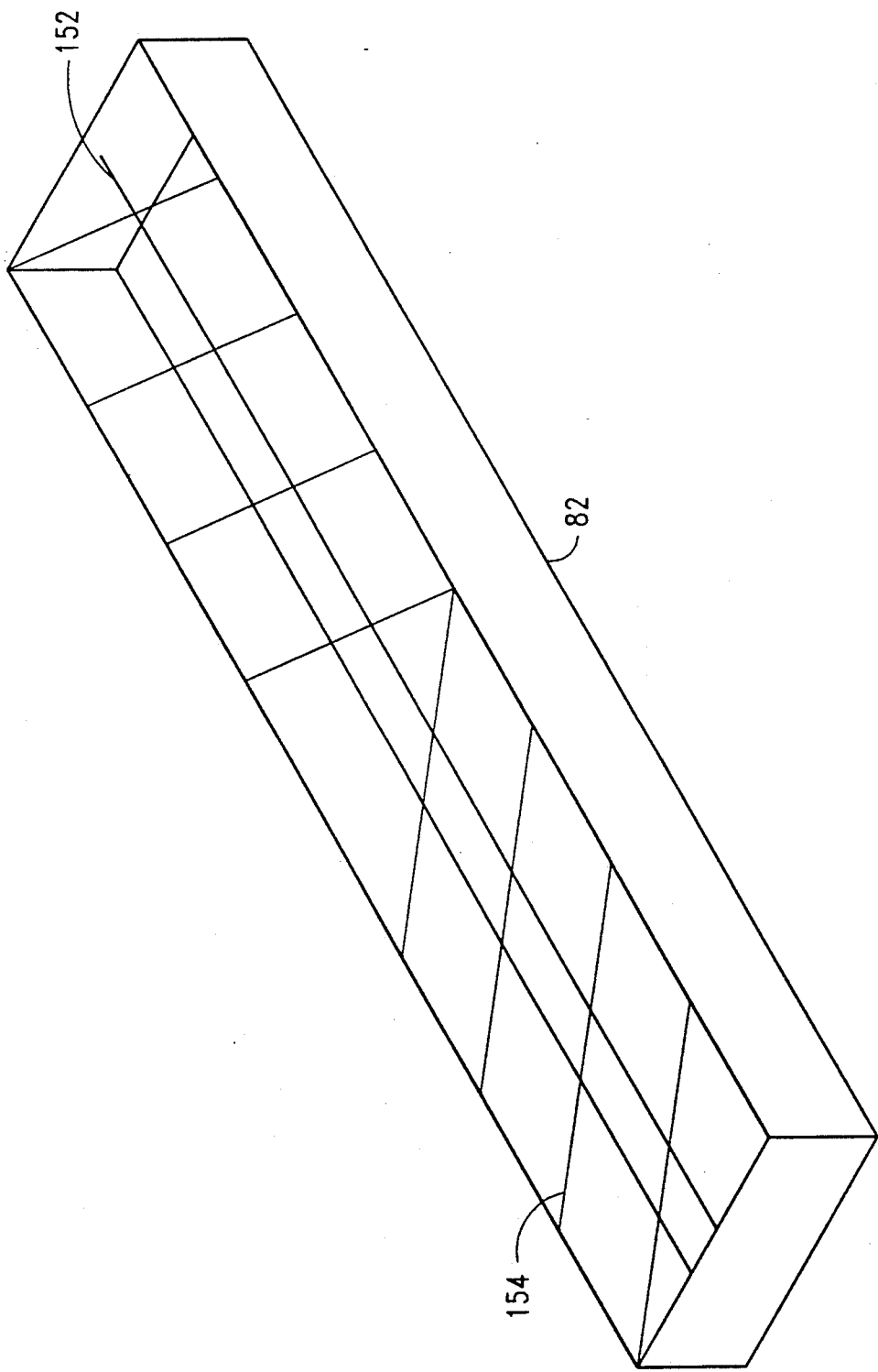
FIG. 2B is a perspective view showing the transfer corona for FIG. 2A.

Referring now to FIG. 2B, this perspective view shows the transfer corona 82 in enlarged detail. In operation, paper 94 passes across the top of the corona 82, while being supported by the paper support wires 154. The corona wire 152 is biased at approximately 6000 volts to exert an electrostatic force on the toner to thereby cause transfer of the toner to the paper 94 as is well known in the art.

Various modifications may be made in and to the above described embodiments without departing from the spirit and scope of this invention. The color development systems shown in abbreviated and schematic forms in FIGS. 1A, 1B, and 2A, 2B herein are intended to illustrate broad principles of color image development and operation without being specifically limited to any particular hardware, design, or to the use with only the subtractive colors of cyan, magenta, yellow, and black. In addition, the present invention may be used with other and different color toner distribution systems other than those two systems, specifically described herein with reference to FIGS. 1A and 2A. Accordingly, these and other mechanical and electrical design variations in both embodiments described herein may be made by those skilled in the art without departing from the scope of the following appended claims.

I claim:

1. A multiple pass electrophotographic color printer including, in combination:
   a. means including a multi-color supply carousel positioned adjacent to a photoconductive drum for transferring primary colors such as cyan, magenta, yellow, and black toner in sequence to the drum during a printing operation, and
   b. media transport means including a pair of drive or grit wheels mounted above and below a fixed position media receiving platform for providing controlled back and forth linear motion of said media as each color is serially transferred respectively from each of a plurality of different color supplies in said carousel, first to said drum and then to said media.

2. The printer defined in claim 1 which further includes means for passing said media by a fuser for fixing the composite color image thereon and then passing sd media into an output paper tray or bin.

3. The printer defined in claim 2 wherein said carousel is a fixed position carousel with stationary compartments therein having cyan, yellow, magenta, and black toner therein and each having a developer roller which may be moved perpendicular to the surface of said photoconductive drum and operative in response to an applied AC and DC voltage to electrostatically and sequentially transfer color toners to said photoconductive drum.

4. A method for printing color image son a print medium which comprises the steps of:
   a. providing a plurality of color toners in a plurality of different locations, respectively, with respect to the surface of a photoconductive drum within a color printer,
   b. depositing said color toners in sequence on said drum,
   c. providing a print medium adjacent to said photoconductive drum, and
   d. utilizing a pair of drive or grit wheels to drive said print medium linearly back and forth on a stationary platform adjacent to said photoconductive drum during transfer, respectively, of each of said color toners from said drum to said print medium, whereby the linear travel length within said color printer may be minimized in order to correspondingly minimize the medium travel dimension of said color printer.

5. The method defined in claim 4 which further includes passing said print medium through a fuser station and then into an output paper tray or bin.

6. The method defined in claim 5 wherein said color toners are electrostatically projected in sequence from separate adjacent toner compartments in a fixed position carousel to the surface of said photoconductive drum.

7. An electrophotographic color printer comprising:
   a. means for supplying color toners in sequence to the surface of a photoconductive drum,
   b. media support means including a stationary platform disposed between the surface of said photoconductive drum and an adjacent transfer roller for providing fixed support for printed media for each separate color image developed on the surface of said drum and then transferred to said media, and
   c. a pair of grit or drive wheels positioned at the edges of the printed media and on opposite sides thereof for driving said printed media linearly back and forth within said printer during transfer of each color plan thereto, whereby the linear travel length within said color printer may be minimized in order to correspondingly minimize the media travel dimension of said color printer.

8. The printer defined in claim 7 wherein said toner supplying means includes a plurality of rollers mounted in separate color toner compartments of a fixed position carousel and operable to electrostatically project color toners onto the surface of said photoconductive drum.

9. The printer defined in claim 8 wherein said media is pivotally mounted at one end thereof and operative to be rotated away from said photoconductive drum during the retraction of media immediately after a color plane image transfer thereto.

* * * * *